(12) United States Patent
Zhang et al.

(10) Patent No.: US 7,627,173 B2
(45) Date of Patent: Dec. 1, 2009

(54) GGN SEGMENTATION IN PULMONARY IMAGES FOR ACCURACY AND CONSISTENCY

(75) Inventors: Li Zhang, Skillman, NJ (US); Tiantian Zhang, Troy, NY (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 728 days.

(21) Appl. No.: 11/189,288

(22) Filed: Jul. 26, 2005

(65) Prior Publication Data

US 2006/0023927 A1    Feb. 2, 2006

Related U.S. Application Data

(60) Provisional application No. 60/598,214, filed on Aug. 2, 2004.

(51) Int. Cl.
*G06K 9/00*    (2006.01)
*G06K 9/34*    (2006.01)

(52) U.S. Cl. .................. 382/173; 382/128; 382/132; 382/154; 382/131

(58) Field of Classification Search ......... 382/128–132, 382/154, 156, 173, 174, 157, 195; 128/922
See application file for complete search history.

(56) References Cited

U.S. PATENT DOCUMENTS

| | | | | |
|---|---|---|---|---|
| 6,138,045 | A * | 10/2000 | Kupinski et al. | 600/425 |
| 7,209,581 | B2 * | 4/2007 | Zhang et al. | 382/131 |
| 7,289,653 | B2 * | 10/2007 | Zhang et al. | 382/131 |
| 7,379,572 | B2 * | 5/2008 | Yoshida et al. | 382/128 |
| 7,466,848 | B2 * | 12/2008 | Metaxas et al. | 382/128 |
| 7,471,815 | B2 * | 12/2008 | Hong et al. | 382/128 |
| 2003/0099391 | A1 * | 5/2003 | Bansal et al. | 382/131 |
| 2005/0254697 | A1 * | 11/2005 | Zhang et al. | 382/131 |
| 2005/0259856 | A1 * | 11/2005 | Dehmeshki | 382/131 |
| 2007/0140541 | A1 * | 6/2007 | Bae et al. | 382/131 |

FOREIGN PATENT DOCUMENTS

WO    WO 2005/013197 A1    2/2005

OTHER PUBLICATIONS

Tanino et al. "A Detection Method of Ground Glass Opacities in Chest X-Ray CT Images using Automatic Clustering Techniques" Medical Imaging 2003: Image Processing, Proc. of SPIE vol. 5032(2003) pp. 1728-1737 (1 to 10).*

Zhang et al. "Consistent interactive Segmentation of Pulmonary Ground Glass Nodules Identified in CT Studies" Medical Imaging 2004:Image Processing, Proc. of SPIE vol. 5370, pp. 1709-1719 (1 to 11).*

Fan et al. "Automatic Detection of Lung Nodules from Multi-Slice Low-Dose CT Images" Medical Imaging 2001: Image Processing, Proc. of SPIE 4322, pp. 1828-1835.*

(Continued)

*Primary Examiner*—Andrew W Johns
*Assistant Examiner*—Mia M Thomas (57) ABSTRACT

A method and system for ground glass nodule (GGN) segmentation. The invention comprises methods and systems for GGN segmentation using adaptive intensity models in conjunction with Markov random field (MRF) based modeling. The adaptive intensity model overcomes problems associated with low-contrast GGN images. Vessels included by MRF segmentation are removed by shape analysis based on distance maps of the segmentation.

22 Claims, 10 Drawing Sheets

OTHER PUBLICATIONS

Li et al. "Markov Random Field for Tumor Detection in Digital Mammography" IEEE Transactions on Medical Imaging, Sep. 1995, No. 3, pp. 565-576 (pp. 1 -12).*

Takizawa et al. "Recognition of Lung Nodules from XRay CT Images using 3D MRF Models" Internation Congress Series (2001)pp. 605-614.*

Held et al. "MRF Segmenation of Brain MR Images" IEEE Trans. on Med. Imaging, vol. 16m No. 6, Dec. 1997, pp. 878-886.*

Choi et al. "Volumetric Object Reconstruction Using the 3D MRF Model Based Segmentation" IEEE Trans. on Med. Imaging, vol. 16, No. 6, Dec. 1997, pp. 887-892.*

* cited by examiner

A VESSEL IS INSIDE A GGN

GGN SEGMENTATION IN PULMONARY IMAGES FOR ACCURACY AND CONSISTENCY

REFERENCE TO RELATED APPLICATION

This application claims the benefit of U.S. Provisional Application No. 60/598,214, filed on Aug. 2, 2004, which is incorporated herein by reference in its entirety.

BACKGROUND

The invention relates generally to image segmentation. More specifically, embodiments of the invention relate to methods and systems which provide computer-based ground glass nodule segmentation using Markov random field analysis and intensity model adaptation for fast, objective and consistent volume measure for lung cancer diagnosis.

Lung cancer remains a leading cause of cancer death in both women and men in the USA. More people die of lung cancer than of colon, breast, and prostate cancers. Assuming that intervention at early stages leads to higher survival rates, it is a major public health directive to improve the survival rate and to reduce the mortality of lung cancer through detection and intervention at an earlier and potentially more curable stage.

Computed tomography (CT) is considered to be the most accurate imaging modality available for early detection and diagnosis of lung cancer. CT uses special equipment to obtain multiple cross-sectional images of the organs and tissues of the chest, and produces images that are far more detailed than a conventional chest x-ray. CT images can show different types of tissue, including the lungs, heart, bones, soft tissues, muscle and blood vessels, and can be acquired within a single breath hold with a 1 to 3 mm axial collimation. CT scans today use a method called helical CT that captures images of the chest from many angles, and with the aid of a computer, processes the images to create cross-sectional axial, coronal or sagittal images or "slices" of the area of interest. Each image can then be printed out or examined on a computer monitor. CT offers high resolution and fast acquisition times and has resulted in the opportunity to detect small lung nodules in these thin image slices which may represent lung cancers at earlier and potentially more curable stages.

The disadvantage is the examination of hundreds of images. Hundreds of CT images taken per examination must be evaluated by a radiologist. Examinations in the traditional sense of looking at each image in the axial mode are difficult to interpret and lead to a high false-negative rate for detecting small nodules. This results in the potential to miss small nodules, and therefore miss a cancer.

Computer analysis can assist the radiologist in the treatment of lung cancer. For the detection of small lung nodules, a primary metric is size for estimating growth rate. Since cancer is growth, this is one of the most direct methods of indicating cancerous nodules. A second is shape. Determining growth rates requires time and repeated measurements. By observing the size, shape and the appearance of the nodule, a determination of whether a nodule is malignant or benign can be made.

Ground glass nodules (GGNs) are often associated with malignant cancer, and quantitative measure of GGNs is of great importance in cancer diagnosis. GGNs appear as partial opacities in CT and magnetic resonance (MR) lung images and comprise two types, the pure, and the sub-solid or mixed.

GGNs have proved especially problematic in lung cancer diagnosis, as despite frequently being malignant they characteristically have extremely slow growth rates. This is further magnified by the small size of many of these lesions now being routinely detected following the introduction of multislice CT scanners capable of acquiring contiguous, high resolution, 1 to 1.25 mm image sections throughout the thorax within a single breath hold.

A number of computer-aided methods and systems for the automated detection of small nodules from CT chest images have been developed over the years and comprise density-based and model-based approaches. Considering the fact that lung nodules have relatively higher densities than those of lung parenchyma, density-based detection methods employ techniques such as multiple thresholding, region-growing, locally adaptive thresholding in combination with region-growing, and fuzzy clustering to identify nodule candidates in the lungs. False-positive results can then be reduced from the detected nodule candidates by employing a priori knowledge of small lung nodules.

For the model-based detection approaches, the relatively compact shape of a small lung nodule is taken into account while establishing the models to identify nodules in the lungs. Techniques such as N-Quoit filter, template-matching, object-based deformation, and the anatomy-based generic model have been proposed to identify sphere-shaped small nodules in the lungs. Other attempts include automated detection of lung nodules by analysis of curved surface morphology and improvement of the nodule detection by subtracting bronchovascular structures from the lung images. Due to the relatively small size of the existing CT lung nodule databases and the various CT imaging acquisition protocols, it is hard to compare the detection performance among the developed algorithms.

Using the computer-aided diagnosis techniques, the nodule is extracted from the CT images. The difficulty is determining which voxels, or which parts of which voxels belong to a nodule. Once an accurate representation is obtained, measuring size and shape parameters is simplified.

To perform a growth rate measurement, segmentation is performed. Two dimensional methods observe a single image slice and calculate the area of a nodule present on that slice. Three dimensional methods observe the entire volume.

Image segmentation identifies homogeneous regions in an image. The homogeneity can be based on one or more properties such as texture, color, distribution of the densities of the image elements, motion field, etc. The result of the segmentation is either an image of labels identifying each homogeneous region, or a set of contours which describe the region boundaries.

Image segmentation can be performed on 2-dimensional images, sequences of 2-D images, 3-dimensional volumetric imagery or sequences of the latter. Some image segmentation research has focused on 2-D images. If the data is defined on 3-D lattices, such as obtained from series of cross-sectional CT or MRI images, then each image slice is segmented individually.

There exist various techniques for image segmentation. Most methods have been extended from 2-D to 3-D. Random field-based modeling has been extensively used due to its suitability both for analyzing and synthesizing images. The result of the texture segmentation task is very difficult to assess automatically, and typically requires an observer to judge the quality of the segmentation.

Although segmentation of solid nodules can be used clinically to determine volume doubling times quantitatively, reliable methods for segmentation of GGNs have yet to be introduced. Achieving consistent segmentation of GGNs has proven problematic most often due to indistinct boundaries and interobserver variability. What is desired is a computer-based method for obtaining fast, reproducible quantitative measurements of these lesions.

SUMMARY

Although there are various image segmentation methods and systems that assist cancer diagnosis, such systems are not completely satisfactory. The inventors have discovered that it would be desirable to have methods and systems for segmenting nodules with minimal manual interaction.

The invention comprises methods and systems for GGN segmentation using adaptive intensity models in conjunction with Markov random field (MRF) based modeling. The adaptive intensity model overcomes problems associated with low-contrast GGN image slices. Vessels included by MRF segmentation are removed by shape analysis based on distance maps of the segmentation.

One aspect of the invention provides methods for nodule segmentation. Methods according to this aspect of the invention preferably start with selecting a nodule from an image, defining a volume of interest wherein the volume of interest includes the nodule, removing a chest wall from the volume of interest, selecting a predefined initial intensity model, pre-segmenting the volume of interest using a Markov random field with the selected predefined initial intensity model, adapting the intensity model based upon the volume of interest pre-segmentation, and segmenting the volume of interest using a Markov random field with the adapted intensity model.

Another aspect of the method is selecting the predefined intensity model based on performing a two coordinate, intensity profile fit of the volume of interest.

Yet another aspect of the method includes performing a shape analysis to remove blood vessels attached to or near the volume of interest after pre-segmenting and segmenting the volume of interest.

Another aspect of the invention provides methods for segmenting a nodule present in a plurality of images in a numbered series. Methods according to this aspect of the invention preferably start with selecting a nodule on one image from the series of images, the selected image defining a center image in the numbered series, defining a volume of interest wherein the volume of interest includes the nodule, removing a chest wall from the volume of interest, selecting a predefined initial intensity model, processing comprising pre-segmenting the volume of interest using a Markov random field with the selected predefined initial intensity model, adapting the intensity model based upon the volume of interest pre-segmentation, segmenting the volume of interest using a Markov random field with the adapted intensity model, and updating the intensity model based upon neighboring slice segmentation, sequentially repeating the processing or each remaining image increasing in magnitude in the numbered series from the center image, and sequentially repeating the processing for each remaining image decreasing in magnitude in the numbered series from the center image.

Other objects and advantages of the methods and systems will become apparent to those skilled in the art after reading the detailed description of the preferred embodiment.

DETAILED DESCRIPTION OF THE PREFERRED EMBODIMENTS

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

It should be noted that the invention is not limited to any particular software language described or implied in the figures. One of ordinary skill in the art will understand that a variety of alternative software languages may be used for implementation of the invention. It should also be understood that some components and items are illustrated and described as if they were hardware elements, as is common practice within the art. However, one of ordinary skill in the art, and based on a reading of the detailed description would understand that in at least one embodiment, components in the method and system may be implemented in software or hardware.

Embodiments of the invention provide methods, systems, and a computer-usable medium storing computer-readable instructions for an image segmentation application that allows medical practitioners to select from a plurality of patient files that contain image files for diagnosing cancerous nodules of the lung. The application functionality allows the medical practitioner to store and access a plurality of individual patient files for viewing newly received lung images for processing in accordance with the invention, and for comparing the results with archived, processed lung images for rendering a cancer diagnosis. The invention can provide notification when a patient condition requires attention, or more importantly, where the lack of attention will result in a misdiagnosis.

The invention is a modular framework and is deployed as software as an application program tangibly embodied on a program storage device. The application is accessed through a graphical user interface (GUI). The application code for execution can reside on a plurality of different types of computer readable media known to those skilled in the art. Users access the framework by accessing the GUI via a computer.

Scanning devices such as high-resolution CT imaging, MR imaging, positron emission tomography (PET) and others, produce and output high resolution digital image data files used by the invention. CT and MR imaging can resolve differences in patient tissue properties of one part in several thousand. For example, the pixels of a CT image are proportional to tissue electron density and are usually expressed in Hounsfield units which roughly cover the numerical range −1000 to +1000 and are typically stored as a 16-bit integer. Two industry standard file formats that support 16-bit data are DICOM and TIFF.

Figure 1:
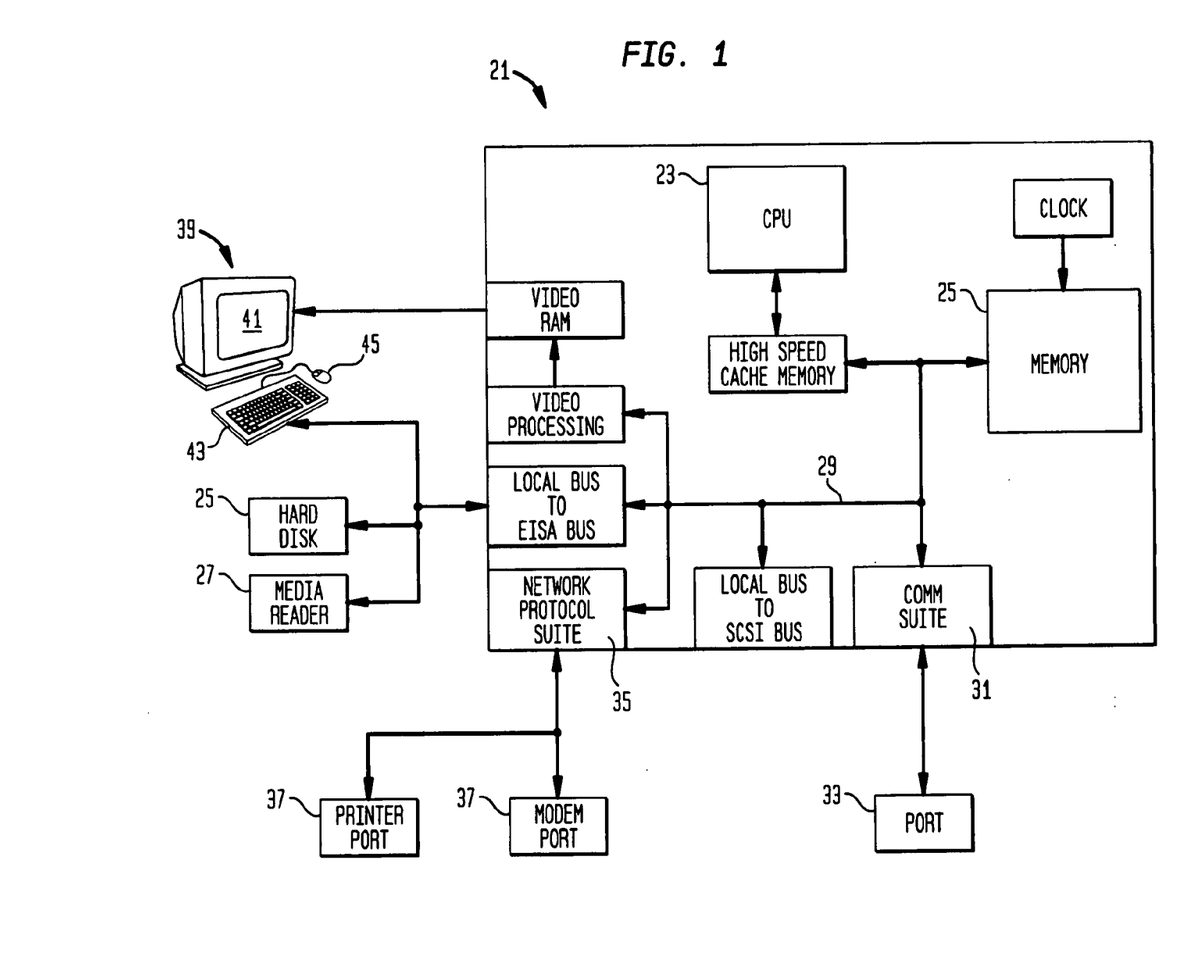
FIG. 1 is a block diagram of an exemplary computer.

An embodiment of a computer 21 executing the instructions of an embodiment of the invention is shown in FIG. 1. A representative hardware environment is depicted which illustrates a typical hardware configuration of a computer. The computer 21 includes a CPU 23, memory 25, a reader 27 for reading computer executable instructions on computer readable media, a common communication bus 29, a communication suite 31 with external ports 33, a network protocol suite 35 with external ports 37 and a GUI 39.

The communication bus 29 allows bi-directional communication between the components of the computer 21. The communication suite 31 and external ports 33 allow bi-directional communication between the computer 21, other computers 21, and external compatible devices such as laptop computers and the like using communication protocols such as IEEE 1394 (FireWire or i.LINK), IEEE 802.3 (Ethernet), RS (Recommended Standard) 232, 422, 423, USB (Universal Serial Bus) and others.

The network protocol suite 35 and external ports 37 allow for the physical network connection and collection of protocols when communicating over a network. Protocols such as TCP/IP (Transmission Control Protocol/Internet Protocol) suite, IPX/SPX (Internetwork Packet eXchange/Sequential Packet eXchange), SNA (Systems Network Architecture), and others. The TCP/IP suite includes IP (Internet Protocol), TCP (Transmission Control Protocol), ARP (Address Resolution Protocol), and HTTP (Hypertext Transfer Protocol). Each protocol within a network protocol suite has a specific function to support communication between computers coupled to a network. The GUI 39 includes a graphics display such as a CRT, fixed-pixel display or others 41, a key pad, keyboard or touchscreen 43 and pointing device 45 such as a mouse, trackball, optical pen or others to provide an easy-to-use, user interface for the invention.

The computer 21 can be a handheld device such as an Internet appliance, PDA (Personal Digital Assistant), Blackberry device or conventional personal computer such as a PC, Macintosh, or UNIX based workstation running their appropriate OS (Operating System) capable of communicating with a computer over wireline (guided) or wireless (unguided) communications media. The CPU 23 executes compatible instructions or software stored in the memory 25. Those skilled in the art will appreciate that the invention may also be practiced on platforms and operating systems other than those mentioned.

The computer 21 includes a suitable image rendering application that can process digital image data of an acquired image dataset to generate and display 2-D and/or 3-D images on the display 41. The image rendering system may be an application that provides 2D/3D rendering and visualization of medical image data and which executes on the computer. The image rendering system enables a user to navigate through a plurality of 2-D image slices or a 3-D image.

Figure 2A:
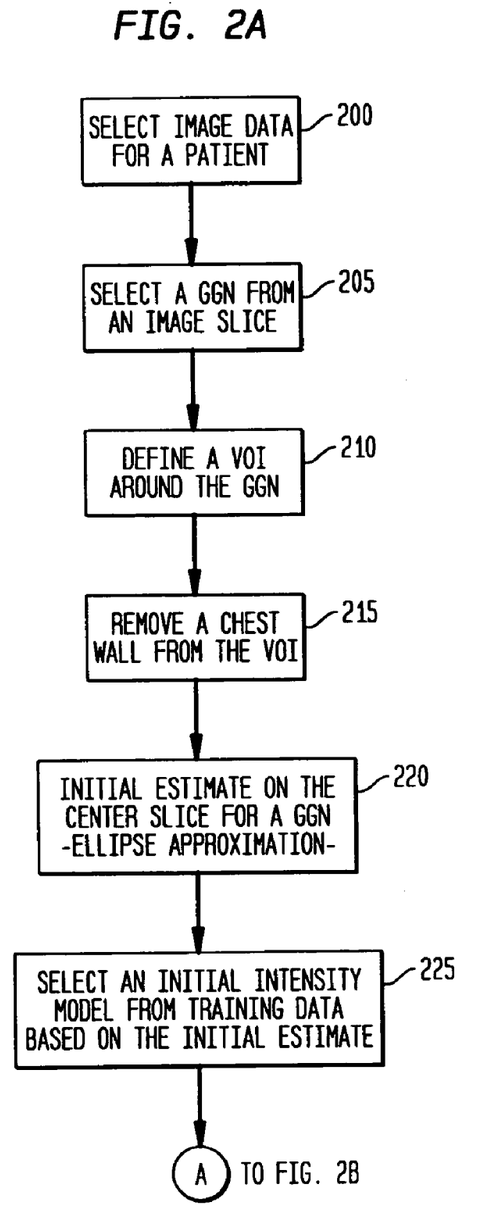
FIGS. 2a and 2b is a block diagram of an exemplary method according to an embodiment of the invention.
Figure 2B:
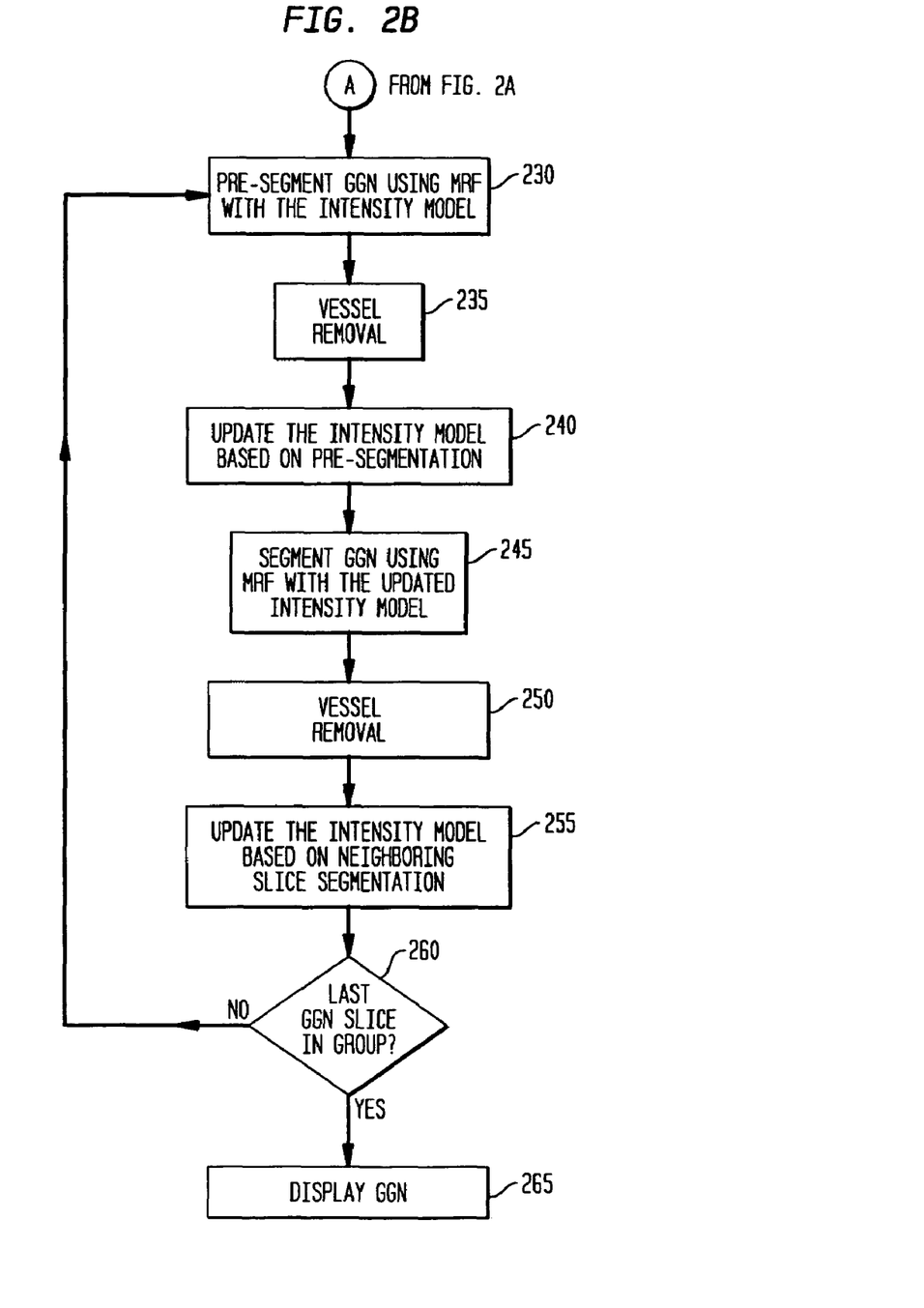
Figure 3:
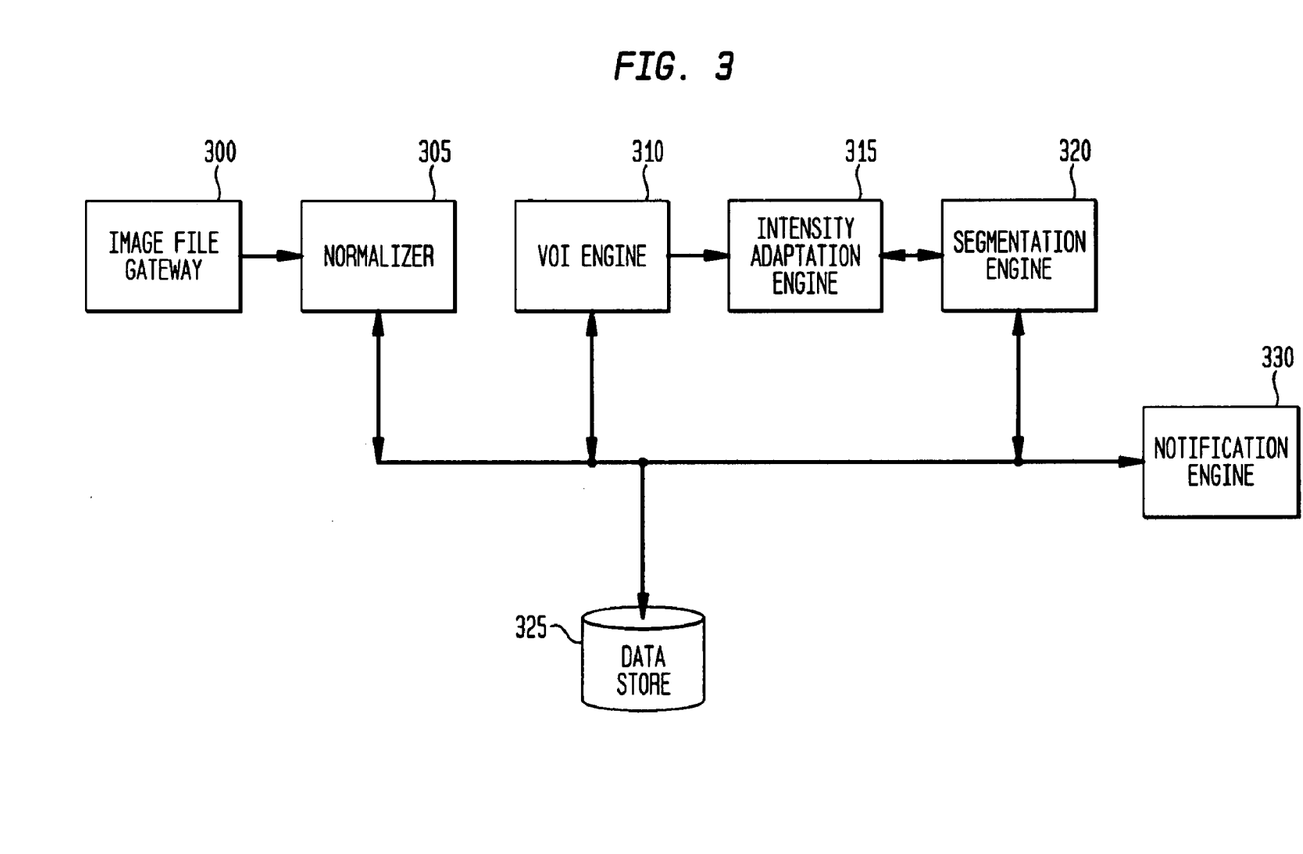
FIG. 3 is an exemplary framework of the individual modules of the invention.

Shown in FIGS. 2a and 2b is a flowchart of a method for nodule segmentation according to one embodiment of the invention. Shown in FIG. 3 is a corresponding segmentation framework of the various modules that comprise the invention as executed by the computer 21. The invention framework allows effective integration of database information and shows data flow through a set of coupled modules comprising the invention. The modules include an image file gateway 300, a normalizer 305, a volume of interest (VOI) engine 310, an intensity adaptation engine 315, a segmentation engine 320, a data store 325, and a notification engine 330.

Figure 9:
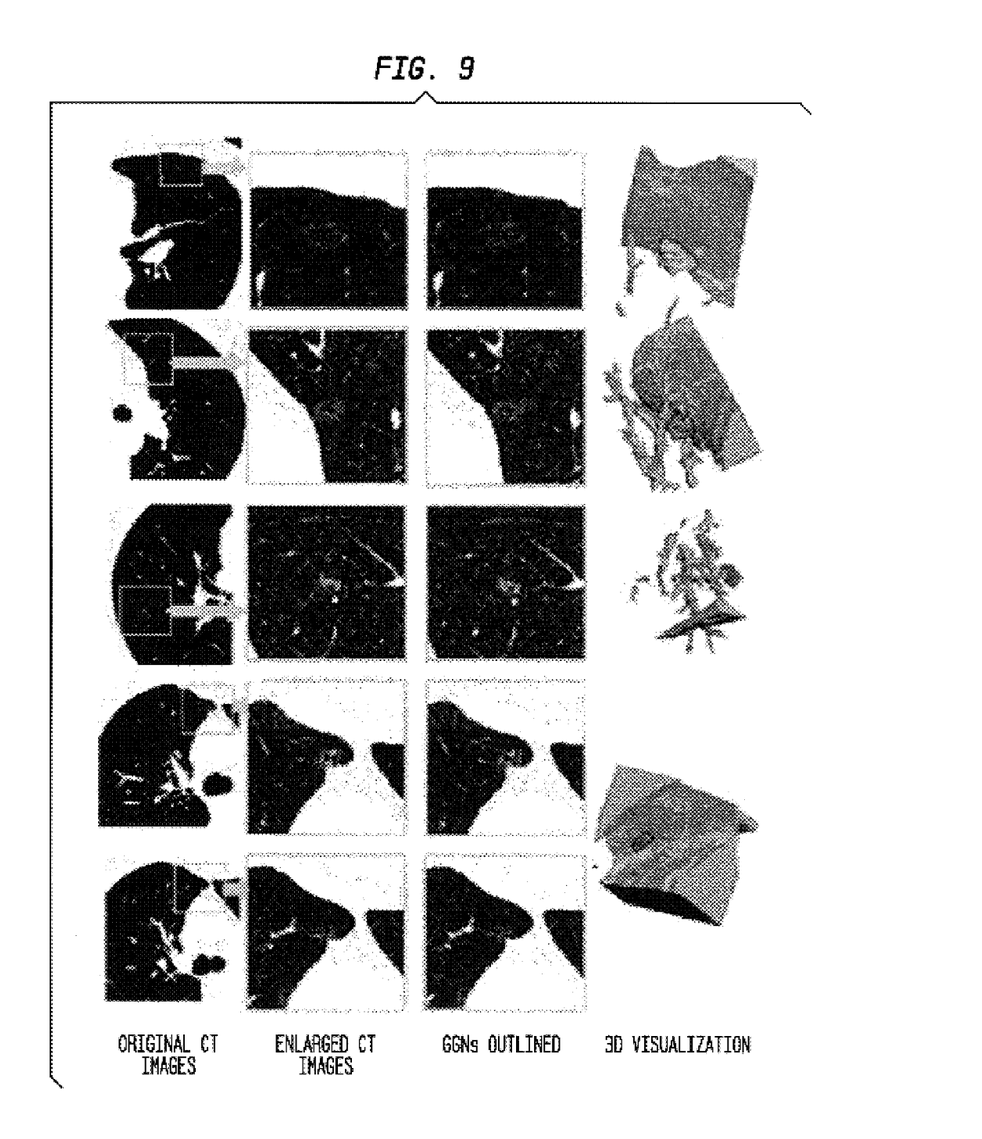
FIG. 9 shows before and after GGN segmentation of five different original CT image slices each having a selected GGN according to an exemplary embodiment of the invention.
Figure 10:
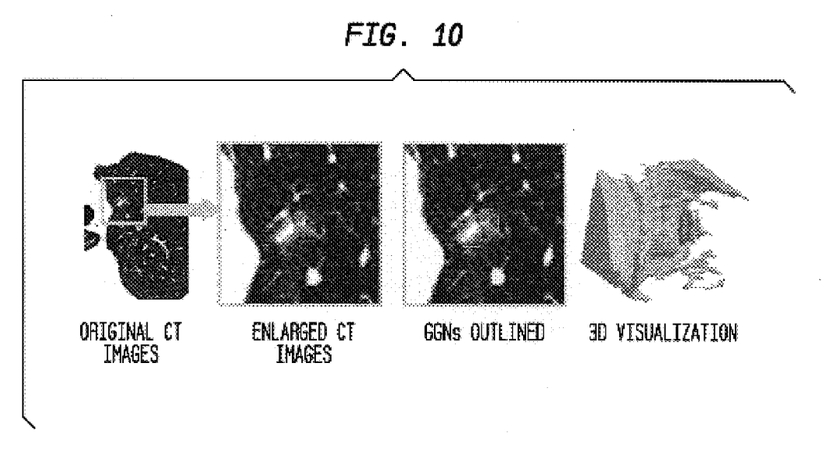
FIG. 10 shows before and after GGN segmentation of a CT image having a GGN with an attached vessel according to an exemplary embodiment of the invention.

2-D image data from a patient's lung CT, MR or PET imaging scan is imported, loaded, or downloaded from another computer or a network server to the computer 21 where the invention is resident. The images are converted if necessary, using the normalizer 305 into a compatible software/hardware format for the framework. The segmentation framework receives and processes patients' digital medical image data which may be in the form of raw image data, or 2-D reconstructed data such as a plurality of axial image slices. The invention results of segmented, processed images can be output from the segmentation engine 320 or data store 325 to the image rendering system for generating 2-D or 3-D renderings for examining color or intensity variations of organs or anatomical structures. After completion of the method of the invention, the 2-D images may then be translated into 3-D renderings as shown in FIGS. 9 and 10.

Methods and systems according to the invention for GGN segmentation may be implemented as extensions or alternatives to conventional segmentation methods used for processing medical image data. It is to be appreciated that exemplary methods and systems described herein can be readily implemented with medical images and computer-aided diagnosis (CAD) systems, or applications that are adapted for a wide range of imaging modalities such as CT, MRI, PET, etc., and for diagnosing and evaluating various abnormal pulmonary structures or lesions with the similar appearance of GGNs in CT images. Although exemplary embodiments may be described herein with reference to particular imaging modalities or particular anatomical features, nothing should be construed as limiting the scope of the invention.

After inputting data from an imaging device to the computer 21, using the GUI 39, a user selects a patient file and selects an image file (step 200). The user navigates through the image file data to manually identify and select an image slice best representative of a suspect GGN. For example, a suspect GGN may span from about 3 to 15 image slices in an associated image series group. The nodule is selected (step 205) defining a center slice. The selection can be performed manually from the GUI 39 by a medical practitioner such as a radiologist, or by using a computer-aided GGN detection technique.

After a GGN is selected, a VOI is defined by the VOI engine 310 (step 210). The size and/or shape of the VOI are defined automatically to include and enclose the selected GGN. Examples of VOI selection are shown in FIGS. 9 and 10 as original CT images, indicated by the area within a square box confining a suspect GGN.

Pre-processing of the VOI is performed to remove a chest wall. The portion of the VOI that belongs to the chest wall is excluded from the VOI (step 215) to obviate any potential for error during segmentation. This is accomplished by performing a region growing technique to remove non-nodule elements in the VOI that belongs to a chest wall.

To overcome low contrast nodule images, MRF optimization is performed by the invention from initial estimates of GGNs taken empirically from 2-D and 3-D images to provide the best starting condition for the iterative MRF optimization process and to model the intensity distribution when calculating the intensity conditional probability of the MRFs. The predefined, initial intensity estimates are held in the data store 325 for retrieval by the intensity adaptation engine 315.

Figure 4:
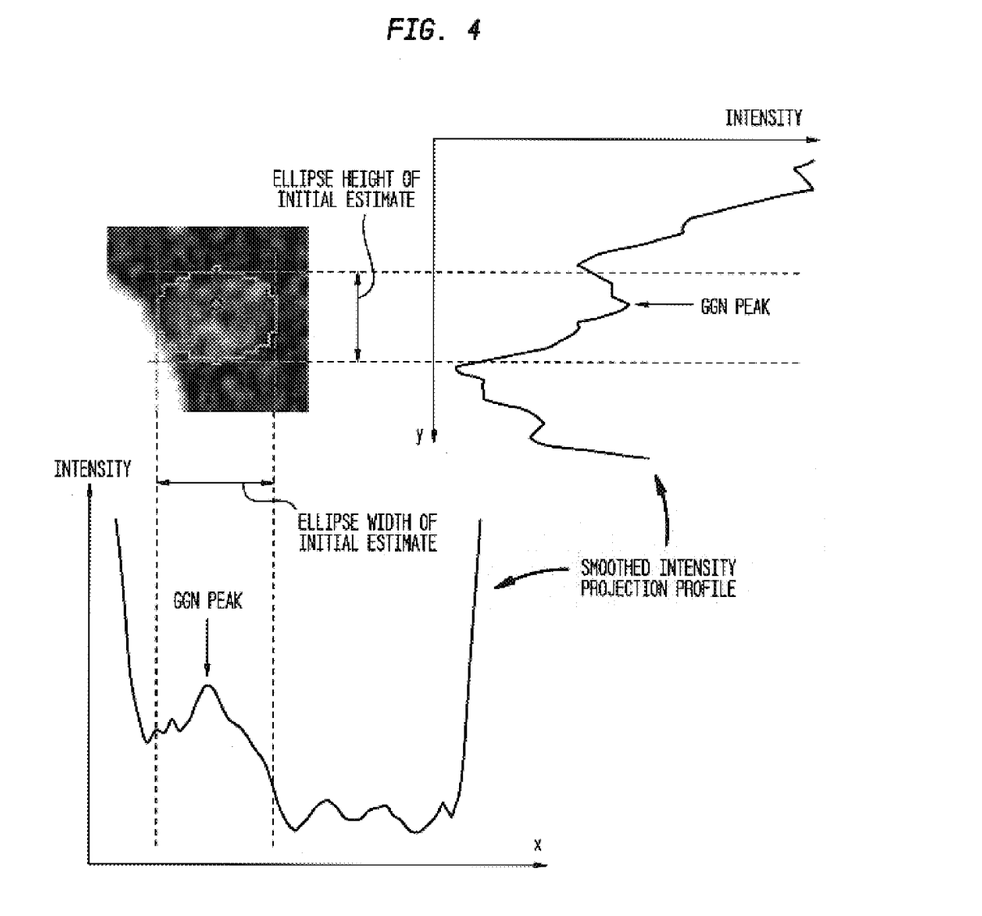
FIG. 4 is an initial intensity estimation model according to an exemplary embodiment ion.
Figure 5A:
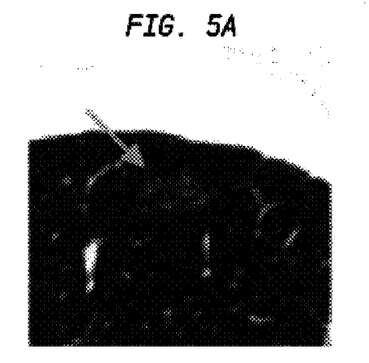
FIGS. 5a-5d show intensity distribution variance among several GGN image slices.
Figure 5B:
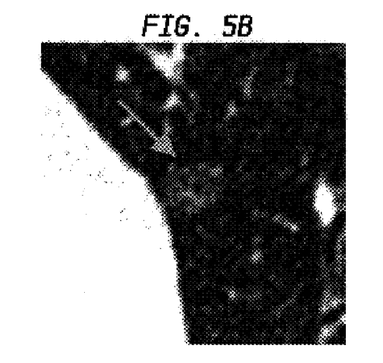
Figure 5C:
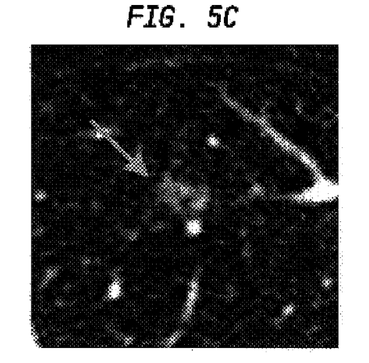
Figure 5D:
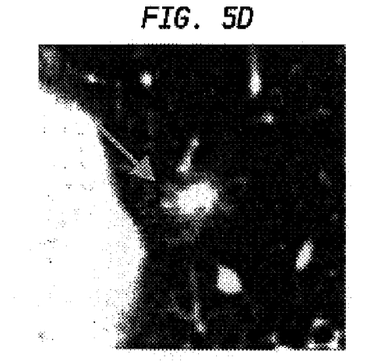

To further overcome low contrast in the image, GGN segmentation is initialized on GGN center slices where the GGN periphery is most distinguishable providing for more robust initial estimates than with non-center, neighboring slices. A user examines a series of nodule image slices to detect GGNs and identifies an image slice as a center slice for segmentation purposes. In this context, "center" does not mean the middle image in a series group of GGN images, just a best representation. For example, in an image series group comprising five images slices, a center image can be any one of the five image slices. Since GGNs can appear ellipse-like on center slices, intensity projection profiles from the major and minor axes of an ellipse model are calculated by the intensity adaptation engine 315 by searching for image intensity peaks from intensity gradients (representing the GGN) as shown in FIG. 4 (step 220). The intensity adaptation engine 315 calculates the mean and standard deviation intensity estimates from the ellipse model yielding a beginning value of $\mu$ and $\sigma$ for the intensity models (step 225).

Bayesian methods use probability calculus to quantify the plausibility of a hypothesis. In the case of image segmentation, this hypothesis concerns the existence of a particular hidden field, i.e., label field realization, along with data. A priori knowledge, which can be exploited to improve the results, is used to regularize the inference of the hidden field, given the data. Formal optimization techniques are then used to work on the a posteriori inference.

Bayes' theorem states $$P(L|F) \propto P(F|L)P(L), \quad (1)$$

where the a posteriori probability P(L|F) of the label field given the data is proportional to the product of the intensity model probability P(F|L) and the a priori probability of the label realizations P(L). P(L) is defined using local information about the expected segmentation result such as shape and aims at encouraging spatial connectivity.

Bayes statistics is a theory of estimation and decision making. Accordingly, when both the prior distribution and the likelihood function of a pattern are known, the best that can be estimated from these sources of knowledge is the Bayes labeling. The maximum a posteriori (MAP) solution as a special case in the Bayes framework is sought.

MRF segmentation is given by the MAP and the a posteriori probability. P(L|F) can be obtained from the conditional intensity probability P(F|L) and a priori probability P(L) using Bayes' theorem (1) where the conditional intensity probability is calculated from the intensity model derived below.

MAP estimation maximizes the a posteriori probability P(L|F) that can be expressed as the product of the a priori probability P(L) and the conditional probability P(F|L). The a priori probability P(L) is typically characterized by the neighborhood interactions that can be modeled by the MRFs. The conditional probability P(F|L) represents the observations of image distributions.

One way to incorporate spatial correlations into a segmentation process is to use MRFs as a priori models. The MRF is a stochastic process that specifies the local characteristics of an image and is combined with the given data to reconstruct the true image. The MRF of prior contextual information is a powerful method for modelling spatial continuity and other scene features, and modeling of this type can provide useful information for the segmentation process.

The MRF labels a voxel by considering the labeling of its neighborhood. MRFs are energy functions that capture only nearest neighbor interactions.

Figure 6A:
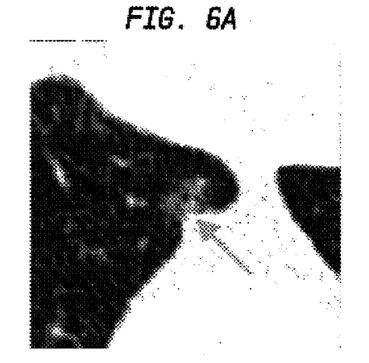
FIGS. 6a and 6b show intensity distribution variance on two image slices in the same series for the same GGN.
Figure 6B:
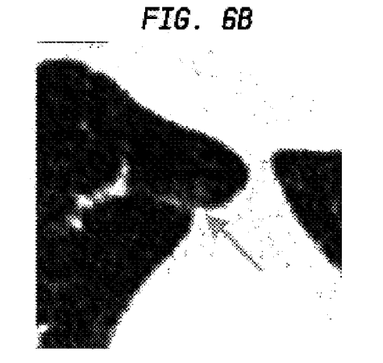

The Bayesian estimation is then accomplished by a joint optimization such that the estimate not only matches the image intensity observation, but also the a priori knowledge of the desired neighborhood interaction. The intensity distribution varies not only for different GGNs as shown in FIG. 5, but also for different image slices from the same GGN image series group as shown in FIG. 6. The intensity model has to be adapted for each image slice in the image series group for the same GGN.

For a priori probability functions, MRFs can be used. Examples include robust unsupervised segmentation of noisy, non-textural images, and for unsupervised segmentation of textured images. The MAP approach aims at maximizing P(L|F), given the model and the a priori. The Bayesian method offers a general framework which can be employed for 2-D or 3-D image data modeling and can incorporate very complex models.

The VOI is pre-segmented (step 230) by the segmentation engine 320. Segmentation techniques may be used in the invention other than MRFs as one skilled in the art understands. Pre-segmentation is performed to obtain an initial segmentation state for an iterated condition mode (ICM) procedure as discussed below.

After pre-segmenting the VOI, the VOI is again segmented using an MRF (steps 240-245). An MRF, which specifies a nonlinear interaction between similar and different features, is used, for example, to combine and organize spatial and temporal information by introducing generic knowledge about features to be estimated. By applying an MRF (step 230), the MRF gives an a priori probability by applying spatial constraints from neighboring voxels in the VOI. A label can then be assigned to each voxel in the VOI by taking into account intensity and spatial constraints from neighboring voxels. GGNs can be given one label type and non-GGNs or background information, for example, lung parenchyma, blood vessels, chest wall portions, etc. are given another label type, thereby allowing the VOI to be segmented using MRF to be displayed discretely illustrating a GGN area from background as shown in FIGS. 9 and 10, where a GGN is enclosed by a jagged line in the center of an image.

From the training data, where the boundaries of GGNs were manually predefined, using Gaussian fitting to the histograms of GGNs and their backgrounds, a set of intensity models for each GGN and its surrounding background is arrived at.

$$M_i\{N(\mu_g(i), \sigma_g^2(i)), N(\mu_b(i), \sigma_b^2(i))\}, i=1, 2, \quad (2)$$

where $$N(\mu_g(i), \sigma_g^2(i)) \quad (3)$$

and $$N(\mu_b(i), \sigma_b^2(i)) \quad (4)$$

are the Gaussian intensity models for the $i^{th}$ GGN and its surrounding background, respectively. Let $\tilde{\mu}_g$ indicate the mean intensity value of the initial estimate of the GGN being ed, then the initial intensity model $$\hat{M}\{N(\hat{\mu}_g, \hat{\sigma}_g^2), N(\hat{\mu}_b, \hat{\sigma}_b^2)\} \quad (5)$$

can be selected as follows $$\hat{M}\{N(\hat{\mu}_g, \hat{\sigma}_g^2)N(\hat{\mu}_b, \hat{\sigma}_b^2)\} = \arg\min < | \tilde{\mu}_g - \mu_g(i) | | M_i\{N(\mu_g(i), \sigma_g^2(i)), N(\mu_b(i), \sigma_b^2(i))\}, i=1,2,\ldots > \quad (6)$$

Since the intensity distribution varies for different GGNs, the initial model selected from the training data models might not be fit the intensity distribution of the GGN being segmented. To avoid this problem, a 95% confidence interval on mean $\tilde{\mu}_g$ of the initial intensity estimate is calculated. If the selected training model mean $\mu_g(i)$ is not in the 95% confidence interval, $\tilde{\mu}_g$, $\hat{\mu}_g$, $\hat{\sigma}_g$, $\hat{\mu}_g$ and $\hat{\sigma}_g$ in the initial model are set to the mean and standard deviation of the initial estimate of the GGN and its surrounding background for the VOI by the intensity adaptation engine 315.

Using $$\hat{M}\{N(\hat{\mu}_g, \hat{\sigma}_g^2), N(\hat{\mu}_b, \hat{\sigma}_b^2)\} \quad (7)$$

to calculate the conditional intensity probability P(F|L) in the MRF, the GGN pe-segmented (step 230).

Let $\mu_g$, $\sigma_g$, $\mu_b$ and $\sigma_b$ denote the mean and standard deviation of the pre-segmentation of the GGN and its surrounding background for the VOI, then the intensity model is updated to $$M\{N(\mu_g, \sigma_g^2), N(\mu_b, \sigma_b^2)\} \quad (8)$$

which is used in the MRF to obtain final segmentation (step 245). For other non-center slices (slices without initial estimates), the mean and standard deviation of the GGN and its surrounding background on the neighboring slice are calculated to set the initial model $$\hat{M}\{N(\hat{\mu}_g, \hat{\sigma}_g^2), N(\hat{\mu}_b, \hat{\sigma}_b^2)\} \quad (9)$$

For pre-segmentation on the current slice, final segmentation is then performed with the intensity model updated by the pre-segmentation results (step 255). The intensity model is adapted locally for each GGN and therefore provides more accurate conditional intensity probability for MRF optimization.

This process is repeated until all neighboring GGN slices in the image group series are segmented (step 260) as shown in FIG. 2b. For example, if an image series group for a suspect nodule comprises 6 image slices, and slice 4 in the series was chosen as the center slice, the method would process slice 4 first (steps 205-260), and then, in either increasing series magnitude or decreasing series magnitude (either direction), proceed with processing the neighbors of the center slice, slice 3 or slice 5. If slice 5 was chosen, segmentation would process slice 5 (steps 230-260), followed by slice 6 (steps 230-260). The invention would then process slice 3 (steps 230-260), followed by slice 2 (steps 230-260) and finally slice 1 (steps 230-260).

Figure 7A:
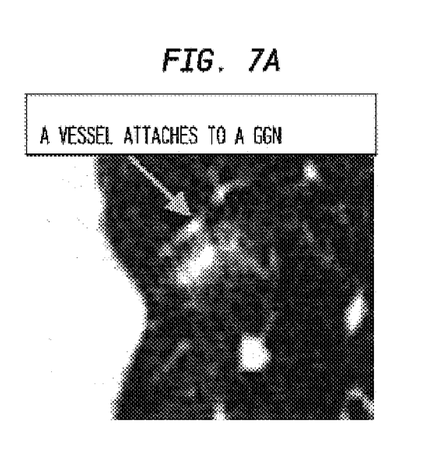
FIG. 7a shows an image having a selected GGN with an outside blood vessel attached to the GNN.
Figure 7B:
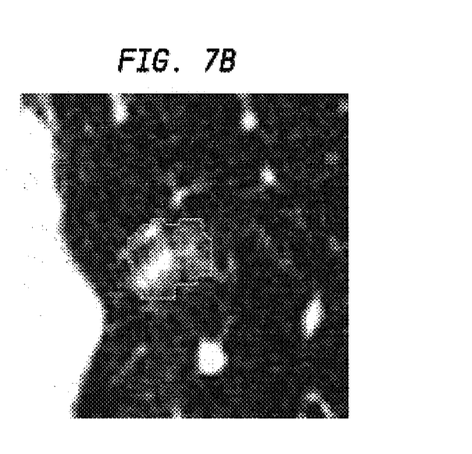
FIG. 7b shows the GGN of FIG. 7a segmented. The attached blood vessel is included in the GNN segmentation erroneously.
Figure 8A:
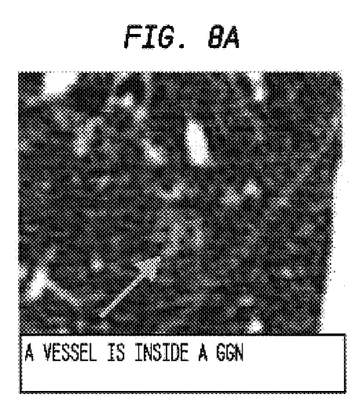
FIG. 8a shows an image having a selected GGN with an internal blood vessel.
Figure 8B:
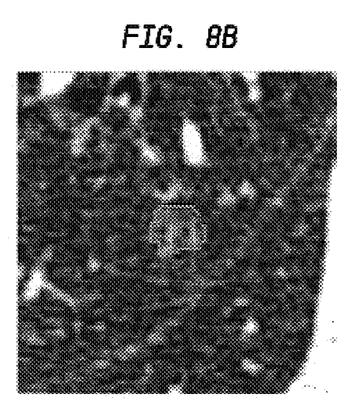
FIG. 8b shows the GGN of FIG. 8a segmented.

GGN segmentation might include attached vessels erroneously when nearby blood vessels are present as shown in FIGS. 7a and 7b. Although the attached vessels, which are included in GGN segmentation, can be easily identified and segmented by thresholding and region growing, they cannot be directly excluded from GGN segmentation since in some cases underlying vessels are inside GGNs and should be included in GGN segmentation as shown in FIGS. 8a and 8b.

Figure 7C:
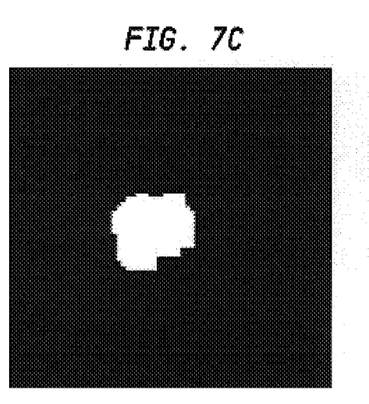
FIG. 7c shows the GGN of FIG. 7a in binary form for distance transformation.
Figure 7D:
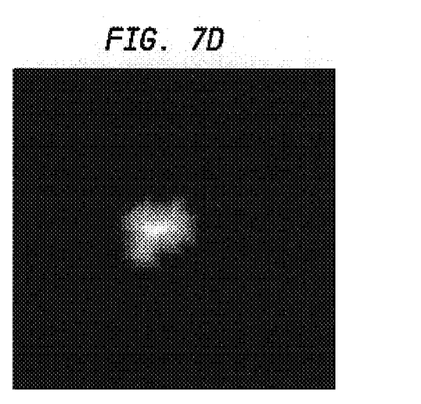
FIG. 7d shows a resultant distance map of the GGN segmentation of FIG. 7c according to an exemplary embodiment of the invention.
Figure 8C:
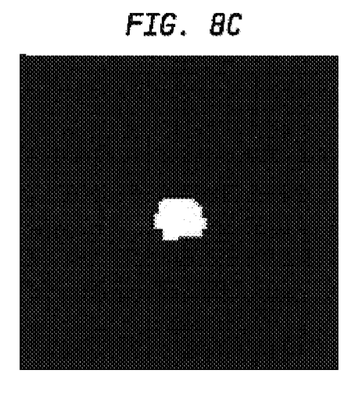
FIG. 8c shows the GGN of FIG. 8a in binary form for distance transformation.
Figure 8D:
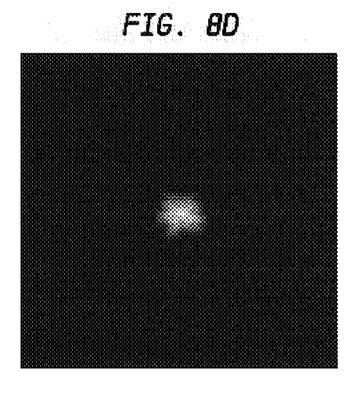
FIG. 8d shows a resultant distance map of the GGN segmentation of FIG. 8c according to an exemplary embodiment of the invention.

From the above, the attached vessels should be excluded from GGN segmentations while the inside vessels should be kept. Distance maps are calculated by the segmentation engine 320 and are employed to distinguish attached vessels from vessels inside a nodule. Applying distance transforms to the binary representation of a GGN segmentation as shown in FIGS. 7c and 8c, yields distance map $$D_{\bar{x}}, \bar{x} \in VOI \quad (10)$$

as shown in FIGS. 7d and 8d. Let G represent the GGN segmentation and $V_i$, i=1,2, . . . represent an identified and segmented vessel within the GGN segmentation, i.e., $V_i \subset G$, i=1,2, . . . The vessels attached to the GGN, denoted by $VS_{attach}$ can be distinguished from the vessels inside the GGN, denoted by $VS_{inside}$ as follows:

$$\begin{cases} \text{if } \arg\max_{\bar{x}}(D_{\bar{x}}, x \in V_i) \leq \frac{1}{2}\arg\max_{\bar{x}}(D_{\bar{x}}, x \in G), \\ \text{then } V_i \in VS_{attach^*} \\ \text{if } \arg\max_{\bar{x}}(D_{\bar{x}}, x \in V_i) > \frac{1}{2}\arg\max_{\bar{x}}(D_{\bar{x}}, x \in G) \\ \text{then } V_i \in VS_{inside^*} \end{cases} \quad (11)$$

After the VOI has been segmented, the segmented VOI can undergo vessel removal. Blood vessels attached to or near the GGN are removed from the segmented VOI by performing the above described distance map evaluation. This function is shown in FIG. 10 where blood vessels that were attached to the GGNs were removed. After each MRF operation (steps 230 and 245), vessel removal is undertaken (steps 235 and 250). The method continues until all neighboring image slices are segmented.

Testing results shown in FIGS. 9 and 10 demonstrate that GGNs having different intensity distributions can be segmented correctly using an adaptive intensity model in accordance with the teachings of the invention. Any attached vessels can be removed correctly by shape analysis based on distance maps.

The GGN is displayed to a user via, for example, the computer 21 display 39 (step 265). Examples of GGNs segmented according to the invention are shown in FIGS. 9 and 10 as outlined portions in the center of the images. A processed (segmented) GGN can be stored in the patent's file in the data store 325 for further review and diagnosis. The invention can be configured via the notification engine 330 to compare newly processed GGN files with previously processed and stored GGN files for the same patient and post an alert for gross indications of grown.

Although the invention herein has been described with reference to particular embodiments, it is to be understood that these embodiments are merely illustrative of the principles and applications of the present invention. Moreover, although hardware or software have been used to implement certain functions described in the present invention, it will be understood by those skilled in the art that such functions may be performed using hardware, software or a combination of hardware and software. It is therefore to be understood that numerous modifications may be made to the illustrative embodiments and that other arrangements may be devised without departing from the spirit and scope of the present invention as defined by the appended claims.

What is claimed is:

1. A method for nodule segmentation comprising:
   selecting an image series group of image slices for a nodule;
   initializing segmentation comprising:
      selecting one image slice from the image series group where a nodule periphery is the most distinguishable as a center slice;
      for the center slice, calculating major and minor axes of an ellipse model by searching for image intensity peaks from intensity gradients representing the nodule;
      calculating mean and standard deviation intensity estimates from the ellipse model for beginning mean and standard deviation intensity estimate values;
      selecting an adaptive intensity model based on the beginning mean and standard deviation intensity estimate values;
   performing an Iterated Condition Mode (ICM) comprising:
      pre-segmenting the nodule on the center slice using the adaptive intensity model in conjunction with Markov Random Field (MRF) based modeling to calculate conditional intensity probability mean and standard deviation values for the nodule and background intensities;
      updating the adaptive intensity model with the conditional intensity probability mean and standard deviation values for the nodule and background intensities obtained from pre-segmentation;
      segmenting the nodule using the updated adaptive intensity model in conjunction with MRF based modeling to calculate conditional intensity probability mean and standard deviation values for the nodule and background intensities;
      updating the adaptive intensity model with the conditional intensity probability mean and standard deviation values for the nodule and background intensities obtained from segmentation; and
   calculating a growth rate measurement for the nodule.

2. The method according to claim 1 wherein the center slice is selected manually.

3. The method according to claim 1 wherein the center slice is selected automatically.

4. The method according to claim 1 wherein each image slice in the nodule image series group is indexed.

5. The method according to claim 4 further comprising:
   choosing an indexing direction; and
   using the segmented center slice as a starting location, performing Iterated Condition Mode (ICM) of the nodule for each image slice in the nodule image series group beginning with the image slice adjacent to the segmented center slice in the chosen indexing direction using the center slice adapted intensity model and proceeding sequentially, ending at the image slice in the nodule image series group at the end of the chosen indexing direction.

6. The method according to claim 5 further comprising:
   reversing the indexing direction;
   using the segmented center slice as a starting location, performing Iterated Condition Mode (ICM) of the nodule for each image slice in the nodule image series group beginning with the image slice adjacent to the segmented center slice in the reversed indexing direction using the center slice adapted intensity model, and proceeding sequentially, ending at the image slice in the nodule image series group at the end of the reversed indexing direction.

7. The method according to 6 further comprising converting a plurality of the segmented image slices for the nodule image series group into a 3D rendering.

8. The method according to claim 1 further comprising defining a set of adaptive intensity models for nodules and background intensities from training data where nodule boundaries are predefined using Gaussian fitting.

9. The method according to claim 1 further comprising calculating a 95% confidence interval for the mean value of the selected adaptive intensity model.

10. The method according to claim 1 further comprising, during Iterated Condition Mode (ICM), removing vessels outside of the nodule after pre-segmenting the nodule and after segmenting the nodule.

11. The method according to claim 10 wherein removing vessels further comprises using distance maps.

12. A system for nodule segmentation comprising:
   a processor and a storage device having embodied therein a program for execution by the processor, the program providing a segmentation framework configured to:
   select an image series group of image slices for a nodule;
   initializing segmentation comprising:
      selecting one image slice from the image series group where a nodule periphery is the most distinguishable as a center slice;
      for the center slice, calculating major and minor axes of an ellipse model by searching for image intensity peaks from intensity gradients representing the nodule;
      calculating mean and standard deviation intensity estimates from the ellipse model for beginning mean and standard deviation intensity estimate values;
      selecting an adaptive intensity model based on the beginning mean and standard deviation intensity estimate values;
   performing an Iterated Condition Mode (ICM) comprising:
      pre-segmenting the nodule on the center slice using the adaptive intensity model in conjunction with Markov Random Field (MRF) based modeling to calculate conditional intensity probability mean and standard deviation values for the nodule and background intensities;
      updating the adaptive intensity model with the conditional intensity probability mean and standard deviation values for the nodule and background intensities obtained from pre-segmentation;
      segmenting the nodule using the updated adaptive intensity model in conjunction with Markov Random Field (MRF) based modeling to calculate conditional intensity probability mean and standard deviation values for the nodule and background intensities;
      updating the adaptive intensity model with the conditional intensity probability values mean and standard deviation values for the nodule and background intensities obtained from segmentation; and calculating a growth rate measurement for the nodule.

13. The system according to claim 12 wherein the center slice is selected manually.

14. The system according to claim 12 wherein the center slice is selected automatically.

15. The system according to claim 12 wherein each image slice in the nodule image series group is indexed.

16. The system according to claim 15 further comprising: choosing an indexing direction; and using the segmented center slice as a starting location, performing Iterated Condition Mode (ICM) of the nodule for each image slice in the nodule image series group beginning with the image slice adjacent to the segmented center slice in the chosen indexing direction using the center slice adapted intensity model, and proceeding sequentially, ending at the image slice in the nodule image series group at the end of the chosen indexing direction.

17. The system according to claim 16 further comprising: reversing the indexing direction;

using the segmented center slice as a starting location performing, Iterated Condition Mode (ICM) of the nodule for each image slice in the nodule image series group be inning with the image slice adjacent to the segmented center slice in the reversed indexing direction using the center slice adapted intensity model and pro ceding sequentially ending at the image slice in the nodule image series group at the end of the reversed indexing direction.

18. The system according to 17 further comprising converting a plurality of the segmented image slices for the nodule image series group into a 3D rendering.

19. The system according to claim 12 further comprising defining a set of adaptive intensity models for nodules and background intensities from training data where nodule boundaries are predefined using Gaussian fitting.

20. The system according to claim 12 further comprising calculating a 95% confidence interval for the mean value of the selected adaptive intensity model.

21. The system according to claim 12 further comprising, during ICM, removing vessels both outside of the nodule after pre-segmenting the nodule and after segmenting the nodule.

22. The system according to claim 21 wherein removing vessels further comprises using distance maps.

* * * * *